(12) United States Patent
Ebersole et al.

(10) Patent No.: US 8,762,255 B2
(45) Date of Patent: Jun. 24, 2014

(54) SYSTEM AND METHOD FOR DISPLAYING HIGHEST AND LOWEST TRADED PRICE OF TRADABLE OBJECTS

(71) Applicant: Trading Technologies International, Inc., Chicago, IL (US)

(72) Inventors: Joan Ebersole, Glen Ellyn, IL (US); Gary Allan Kemp, II, Winnetka, IL (US); Scott Singer, Lake Bluff, IL (US)

(73) Assignee: Trading Technologies International, Inc., Chicago, IL (US)

( * ) Notice: Subject to any disclaimer, the term of this patent is extended or adjusted under 35 U.S.C. 154(b) by 0 days.

(21) Appl. No.: 13/742,855

(22) Filed: Jan. 16, 2013

(65) Prior Publication Data

US 2013/0132261 A1 May 23, 2013

Related U.S. Application Data

(63) Continuation of application No. 12/848,685, filed on Aug. 2, 2010, now Pat. No. 8,392,315, which is a continuation of application No. 10/260,643, filed on Sep. 30, 2002, now Pat. No. 7,813,994.

(51) Int. Cl.
 *G06Q 40/00* (2012.01)
(52) U.S. Cl.
 USPC .......................................................... 705/37
(58) Field of Classification Search
 USPC .......................................................... 705/37
 See application file for complete search history.

(56) References Cited

U.S. PATENT DOCUMENTS

| | | | |
|---|---|---|---|
| 4,674,044 A | 6/1987 | Kalmus et al. |
| 4,750,135 A | 6/1988 | Boilen |
| 4,903,201 A | 2/1990 | Wagner |
| 5,038,284 A | 8/1991 | Kramer |
| 5,077,665 A | 12/1991 | Silverman et al. |
| 5,101,353 A | 3/1992 | Lupien et al. |

(Continued)

FOREIGN PATENT DOCUMENTS

| | | |
|---|---|---|
| EP | 1067471 A1 | 1/2001 |
| WO | 91/14231 A1 | 9/1991 |

(Continued)

OTHER PUBLICATIONS

"APT: A trading system for the future," The London International Financial Futures Exchange (LIFFE), 1990, 11 pages.

(Continued)

*Primary Examiner* — Robert R Niquette
*Assistant Examiner* — Chia Yi Liu
(74) *Attorney, Agent, or Firm* — McDonnell Boehnen Hulbert & Berghoff LLP

(57) ABSTRACT

A client terminal displays on a graphical interface a first indicator of a price associated with a lowest traded price of a tradable object during a predetermined period of time, a second indicator of a price associated with a highest traded price of the tradable object during the predetermined period of time, along with at least one quantity indicator associated with at least one order to buy/order the tradable object. The first indicator, the second indicator, and the at least one quantity indicator are displayed in relation to a static axis of price, and the client terminal dynamically updates the first and second indicator to new lowest and highest traded prices based on market updates received from an exchange.

24 Claims, 8 Drawing Sheets

(56) References Cited

U.S. PATENT DOCUMENTS

| | | |
|---|---|---|
| 5,136,501 A | 8/1992 | Silverman et al. |
| 5,270,922 A | 12/1993 | Higgins |
| 5,297,031 A | 3/1994 | Gutterman et al. |
| 5,297,032 A | 3/1994 | Trojan et al. |
| 5,689,651 A | 11/1997 | Lozman |
| 5,774,877 A | 6/1998 | Patterson, Jr. et al. |
| 5,793,301 A | 8/1998 | Patterson, Jr. et al. |
| 5,797,002 A | 8/1998 | Patterson, Jr. et al. |
| 5,845,266 A | 12/1998 | Lupien et al. |
| 5,915,245 A | 6/1999 | Patterson, Jr. et al. |
| 5,924,082 A | 7/1999 | Silverman et al. |
| 5,924,083 A | 7/1999 | Silverman et al. |
| 5,926,801 A | 7/1999 | Matsubara |
| 5,946,667 A | 8/1999 | Tull, Jr. et al. |
| 5,963,923 A | 10/1999 | Garber |
| 6,012,046 A | 1/2000 | Lupien et al. |
| 6,014,643 A | 1/2000 | Minton |
| 6,035,287 A | 3/2000 | Stallaert et al. |
| 6,098,051 A | 8/2000 | Lupien et al. |
| 6,131,087 A | 10/2000 | Luke et al. |
| 6,134,535 A | 10/2000 | Belzberg |
| 6,195,647 B1 | 2/2001 | Martyn et al. |
| 6,272,474 B1 | 8/2001 | Garcia |
| 6,278,982 B1 | 8/2001 | Korhammer et al. |
| 6,282,521 B1 | 8/2001 | Howorka |
| 6,408,282 B1 * | 6/2002 | Buist .......................... 705/36 R |
| 6,639,614 B1 | 10/2003 | Kosslyn et al. |
| 6,766,304 B2 | 7/2004 | Kemp, II et al. |
| 6,772,132 B1 | 8/2004 | Kemp, II et al. |
| 7,043,449 B1 * | 5/2006 | Li et al. ....................... 705/36 R |
| 7,127,424 B2 | 10/2006 | Kemp, II et al. |
| 7,155,410 B1 | 12/2006 | Woodmansey et al. |
| 7,389,268 B1 | 6/2008 | Kemp, II et al. |
| 7,437,325 B2 | 10/2008 | Kemp, II et al. |
| 7,756,775 B1 | 7/2010 | Ebersole et al. |
| 7,813,994 B1 | 10/2010 | Ebersole et al. |
| 8,027,910 B2 | 9/2011 | Ebersole et al. |
| 2002/0023038 A1 | 2/2002 | Fritsch et al. |
| 2002/0035534 A1 | 3/2002 | Buist et al. |
| 2002/0055899 A1 | 5/2002 | Williams |
| 2002/0059129 A1 | 5/2002 | Kemp et al. |
| 2002/0073016 A1 * | 6/2002 | Furbush et al. ................. 705/37 |
| 2002/0073017 A1 | 6/2002 | Robertson |
| 2002/0099644 A1 | 7/2002 | Kemp, II et al. |
| 2002/0120551 A1 * | 8/2002 | Jones, III ........................ 705/37 |
| 2002/0138401 A1 | 9/2002 | Allen et al. |
| 2003/0004853 A1 | 1/2003 | Ram et al. |
| 2003/0009411 A1 | 1/2003 | Ram et al. |
| 2003/0023542 A1 | 1/2003 | Kemp, II et al. |
| 2010/0299242 A1 | 11/2010 | Ebersole et al. |

FOREIGN PATENT DOCUMENTS

| | | | |
|---|---|---|---|
| WO | 95/26005 | A1 | 9/1995 |
| WO | 98/49639 | A1 | 11/1998 |
| WO | 99/19821 | A1 | 4/1999 |
| WO | 99/30259 | A1 | 6/1999 |
| WO | 99/53424 | A1 | 10/1999 |
| WO | 00/52619 | A1 | 9/2000 |
| WO | 00/62187 | A2 | 10/2000 |
| WO | 00/65510 | A1 | 11/2000 |
| WO | 01/16830 | A1 | 3/2001 |
| WO | 01/16852 | A2 | 3/2001 |
| WO | 01/22315 | A2 | 3/2001 |
| WO | 01/65403 | A2 | 9/2001 |
| WO | WO 0165403 | A2 * | 9/2001 |
| WO | 01/88808 | A1 | 11/2001 |
| WO | 00/62187 | A3 | 12/2001 |
| WO | 01/22315 | A3 | 1/2002 |
| WO | 02/59815 | A1 | 1/2002 |
| WO | 02/15461 | A2 | 2/2002 |
| WO | 02/29686 | A1 | 4/2002 |
| WO | 01/16852 | A8 | 6/2002 |
| WO | 02/48945 | A1 | 6/2002 |
| WO | 02/069226 | A2 | 9/2002 |
| WO | 02/69226 | A2 | 9/2002 |
| WO | 02/79940 | A2 | 10/2002 |
| WO | 02/079940 | A2 | 10/2002 |
| WO | 02/093325 | A2 | 11/2002 |
| WO | 02/93325 | A2 | 11/2002 |
| WO | 03/090032 | A2 | 10/2003 |
| WO | 03/90032 | A2 | 10/2003 |
| WO | 03/090032 | A3 | 10/2003 |
| WO | 03/90032 | A3 | 10/2003 |

OTHER PUBLICATIONS

"AURORA: The most technologically advanced trading system available today," Chicago Board of Trade, 1989, 11 pages.

"Expanding Futures and Options Trading Around the World, Around the Clock," GLOBEX, 1989, 48 pages.

"One Click Trading Options," Trading Technologies, Inc., 1998, one page.

"Sydney Futures Exchange Announces Plans to Join GLOBEX," GLOBEX Report: An Update on the CME global electronic exchange, vol. II, No. 2, Feb. 10, 1989, 4 pages.

Cavaletti, C., "Order Routing," Futures Magazine, Feb. 1997, pp. 68-70.

The Computer Assisted Trading System (CATS) Traders' Manual, Toronto Stock Exchange, Sep. 30, 1977, 142 pages.

Declaration of Brendan Bradley in Case No. 04 C 5312, Nov. 18, 2004, 27 pages.

Grummer, et al., "Preliminary Feasibility Study," Bermudex Ltd., Nov. 1980, 100 pages.

Hansell, S., "The Computer that Ate Chicago," Institutional Investor, Feb. 1989, 5 pages.

Kharouf, J. and Cavaletti, C. "A Trading Room with a View," Futures, vol. 27, Nov. 1998, pp. 66-71.

Market Watch Trading Screen, 2000, 1 page.

Memorandum Opinion and Order of Judge James B. Moran in Case No. 04 C 5312, Feb. 9, 2005, 22 pages.

New York Mercantile Exchange (NYMEX) Access Documents, Feb. 28, 1992, 413 pages.

Peake, et al., Appendix C of Preliminary Feasibility Study, "The ABCs of Trading on a National Market System," Bermudex Ltd., Sep. 1997, 16 pages.

Peake, J.W., Appendix E of Preliminary Feasibility Study, "The Last Fifteen Meters," Bermudex Ltd., Jun. 15, 1997, 18 pages.

StockCharts "ChartWatchers Weekly Summary" Web Page [online], StockCharts.com, Jan. 20, 2001, 9 pages. [Retrieved on Jan. 5, 2010] from the Internet: http://stockcharts.com/commentary/archives/cww20010120h.html.

TimeSales "Getting to Know Corona Time Sales" Web Page [online], RFOINC.com, Jan. 28, 2000, 2 pages. [Retrieved on Jan. 5, 2010] from the Internet: http://web.archive.org/web/20000128183054/http://www.rfoinc.com/corona/timesales.htm/.

TradeTrek "Demand/Supply at a Glance: Bid/Ask Sizes" Web Page [online], TradeTrek.com, Aug. 17, 2000 [Retrieved on Jan. 5, 2010] from the Internet: http://web.archive.org/web/2000817011741/http://www.traedetrek.com/education/exe_skill/execution_skill02.asp.

Trading Screen, INTEX of Bermuda, 1984, one page.

Trading Screen, MEFF Exchange, 1990, one page.

Trading Screen, SWX Exchange, 1990, two pages.

Trading Screen, TIFFE Exchange, circa 1989-1990, one page.

USPTO Presentation, NASDAQ, Nov. 8, 2001, 15 pages.

Weber, B.W., "Information Technology in the Major International Financial Markets," Stern School of Business, New York University, Apr. 7, 1993, pp. 1-43.

X_Trader Product HTML Page [online], Trading Technologies International, Inc., Jun. 9, 2000. [Retrieved on Mar. 22, 2001] from the Internet: www.tradingtechnologies.com/products/xtrade_full.html.

* cited by examiner

| Working Orders 202 | Bid Qty 204 | Ask Qty 206 | Price 208 |
|---|---|---|---|
| | | | 99 |
| | | | 98 |
| | | | 97 |
| | | | 96 |
| | | | 95 |
| | | 400 | 94 |
| | | 120 | 93 |
| | | 180 | 92 |
| | | 120 | 91 |
| B 10  W 0 | 150 | | 90 |
| B 0  W 10 | 100 | | 89 |
| B 0  W 10 | 150 | | 88 |
| | 25 | | 87 |
| | | | 86 |

FIG. 2

SYSTEM AND METHOD FOR DISPLAYING HIGHEST AND LOWEST TRADED PRICE OF TRADABLE OBJECTS

CROSS REFERENCE TO RELATED APPLICATIONS

This application is a continuation of U.S. patent application Ser. No. 12/848,685, filed Aug. 2, 2010, now U.S. Pat. No. 8,392,315, entitled "System and Method for Displaying Highest and Lowest Traded Prices of Tradable Objects," which is a continuation of U.S. patent application Ser. No. 10/260,643, filed Sep. 30, 2002, now U.S. Pat. No. 7,813,994, the contents of which are fully incorporated herein by reference.

FIELD OF INVENTION

The present invention is directed towards electronic trading. More specifically, the present invention is directed towards monitoring lowest and highest traded prices of at least one tradable object and dynamically displaying results thereof using indicators.

BACKGROUND

Many exchanges throughout the world now support electronic trading. Electronic trading has made it possible for an increasing number of people to actively participate in a market at any given time. The increase in the number of potential market participants has advantageously led to, among other things, a more competitive market and greater liquidity.

Exchanges that support electronic trading are generally based on a host, one or more computer networks, and clients. In general, the host includes one or more centralized computers to form the electronic heart. Its operations typically include order matching, maintaining order books and positions, price information, and managing and updating a database that records such information. The host is also equipped with an external interface that maintains uninterrupted contact to the clients and possibly other trading-related systems.

Typically, market participants link to the host through one or more networks. A network is a group of two or more computers linked together. There are many types of networks such as local area networks and wide area networks. Networks can also be characterized by topology, protocol, and architecture. However, any type of network configuration can be used in electronic trading. For example, some market participants may link to the host through a direct connection such as a T1 or ISDN. Some participants may link to the exchange through direct connections and through other common network components such as high-speed servers, routers, gateways, and so on.

Regardless of the way in which a connection is established, software running on the clients allows people to log onto one or more exchanges and participate in one or more markets. Some clients run software that creates specialized interactive trading screens. In general, the trading screens enable people to enter orders into the market, obtain market quotes, and monitor positions. The range and quality of features available varies according to the specific software application being run.

The success of a trader who trades in a competitive electronic trading environment depends on many factors. One of the most important factors is how fast a trader can make a trade. Also important is the ability of a trader to view market changes on real-time basis. In today's market, a trader needs tools to view market movements and trends. There are many currently existing software applications that assist traders with viewing current markets. These applications typically plot real-time market data into a variety of chart formats that may be accessed by a trader at any time during a day. A market chart is often presented as a sequence of prices or volumes that are plotted over a specific time frame, such as over a specific trading day, month, year, or number of years.

Considering the number of screens that a typical trader has to view at the same time, visual viewing of charts may be time consuming and physically demanding. Because viewing market trends is of great importance, it is desirable for electronic trading system to offer tools that can assist a trader in trading in an electronic marketplace, help the trader to make trades at the most favorable prices in a speedy and accurate manner, while being able to conveniently view one or more market trends.

BRIEF DESCRIPTION OF THE DRAWINGS

Example embodiments of the present invention are described herein with reference to the following drawings, in which:

FIG. 2 is a block diagram illustrating an example display having bid and ask quantities displayed in association with a static axis of prices that may be used in accordance with preferred embodiments;

DETAILED DESCRIPTION OF THE PREFERRED EMBODIMENT(S)

Figure 1:
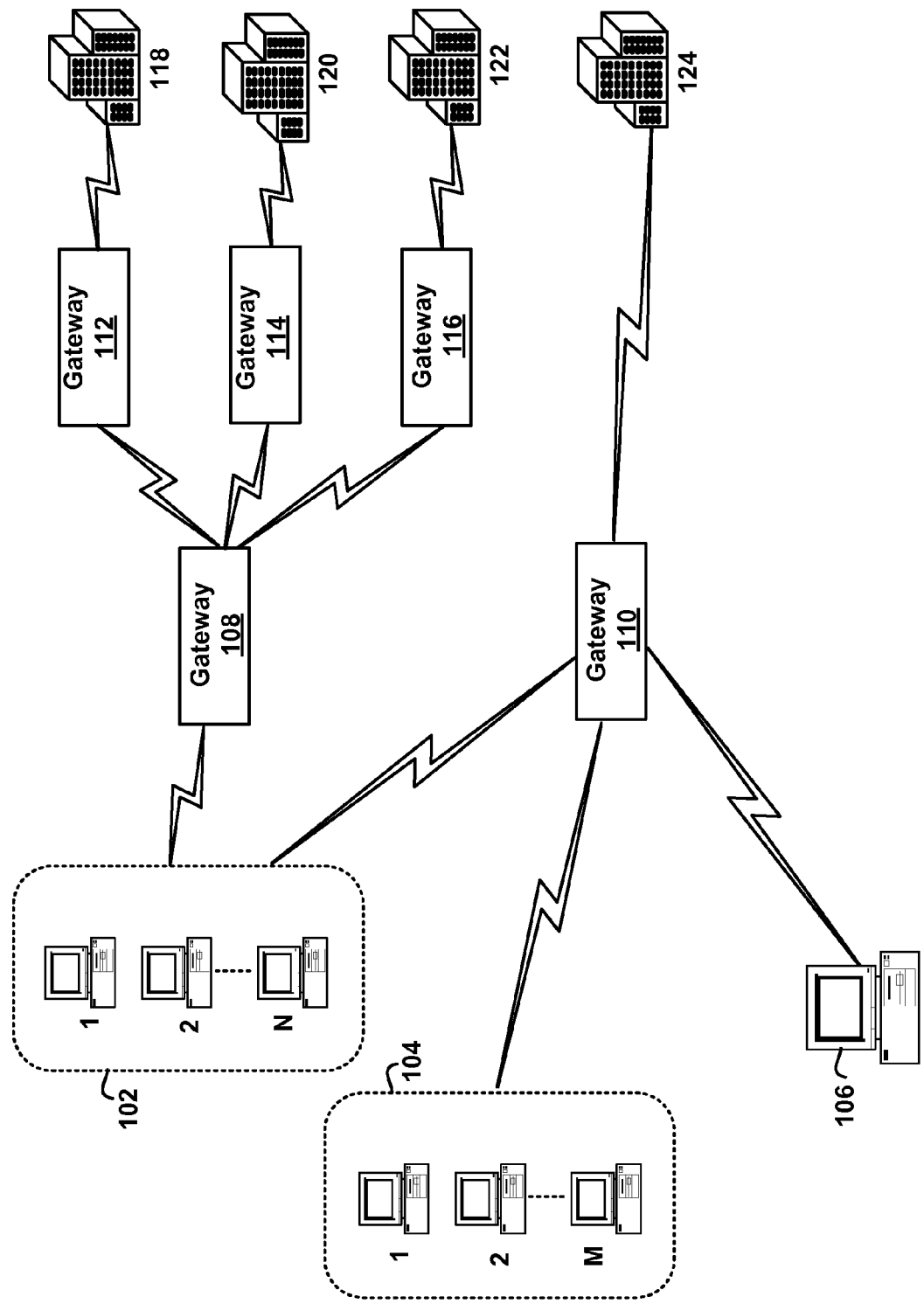
FIG. 1 is an example of a network configuration for a communication system utilized to access one or more exchanges.

It is beneficial to display market information in a manner that allows a trader to quickly monitor how the market fluctuates at any predetermined point of time during a trading day, or a predetermined period of time, in comparison to the current market stage. According to one preferred embodiment, the market information includes the highest traded price and the lowest traded price of a tradable object during a predetermined period of time. As used herein, the term "tradable object" refers simply to anything that can be traded with a quantity and/or price. It includes, but is not limited to, all types of tradable objects such as financial products, which can include, for example, stocks, options, bonds, futures, currency, and warrants, as well as funds, derivatives and collections of the foregoing, and all types of commodities, such as grains, energy, and metals. The tradable object may be "real,"

such as products that are listed by an exchange for trading, or "synthetic," such as a combination of real products that is created by the user.

More specifically, the present invention provides a method and system for dynamically displaying a quantity indicator associated with at least one order (such as a buy order, a sell order, or both) of a tradable object, in combination with dynamically displaying information related to the highest traded price and the lowest traded price of the tradable object during a predetermined period of time. The quantity indicator, the highest traded price, and the lowest traded price are displayed in relation to a static axis of prices. It should be understood that static, in the context of the embodiments described hereinafter, does not mean immovable, but rather fixed in relation. For example, with a static axis of prices, the axis itself may be movable (e.g., via a recentering or repositioning command), but the prices represented remain fixed in relation to the market information, subject to consolidation or expansion. Further, for example, the static axis of prices can stay fixed even when the market moves.

According to the example embodiments, the highest traded price and the lowest traded price shown in relation to the static axis of prices reflect the lowest and highest traded prices of a tradable object during a predetermined period of time that, by default, may include the entire trading day, or, alternatively, may be user configurable. For instance, a user may configure the predetermined period of time to be a specific time interval during a trading day. Therefore, for instance, using the present invention, a trader may view current market fluctuations of prices of a tradable object compared to the highest and lowest traded prices of a tradable object during a trading day.

While the present invention is described herein with reference to illustrative embodiments for particular applications, it should be understood that the present invention is not limited thereto. Those having ordinary skill of art will recognize that many additional modifications and embodiments are possible as well.

FIG. 1 shows an example system that may be used to implement network connection between a plurality of exchanges and client terminals. It should be understood, however, that this and other arrangements described herein are set forth for purposes of example only. As such, those skilled in the art will appreciate that other arrangements and other elements (e.g., machines, interfaces, functions, orders of functions, etc.) can be used instead, and some elements may be omitted altogether. Further, as in most telecommunications applications, those skilled in the art will appreciate that many of the elements described herein are functional entities that may be implemented as discrete or distributed components or in conjunction with other components, and in any suitable combination and location.

Still further, various functions described herein as being performed by one or more entities may be carried out by hardware and/or software logic. For instance, various functions may be carried out by a processor executing a set of machine language instructions stored in memory. Provided with the present disclosure, those skilled in the art can readily prepare appropriate computer instructions to perform such functions.

Referring back to FIG. 1, the illustrated system includes trading houses 102 and 104 that are connected to exchanges 118, 120, 122, and 124 through one or more gateways 108 and 110. The aforementioned exchanges may include the Chicago Board of Trade ("CBOT"), the New York Stock Exchange ("NYSE"), the Chicago Mercantile Exchange ("CME"), the Xetra (a German stock exchange), or the European derivatives market ("Eurex"). However, it should be understood that the exchanges could also include any other currently existing or later created exchanges as well. Additionally, it should be understood that the preferred embodiments are not limited to any particular network architecture or trading application, but rather may be applied with utility on any client device in any network that can be used for electronic trading. Furthermore, the present invention is not limited to a completely electronic trading environment where orders are sent to an electronic matching engine. For example, the invention could be utilized with an electronic trading application, which sends orders electronically to a terminal where a person (e.g., a floor broker) executes those orders in a traditional open outcry trading floor.

Each trading house has one or more client terminals. For example, the trading house 102 includes N client terminals, and the trading house 104 includes M client terminals. It should be understood that N and M could be any number, and the present invention is not limited to any specific number of client terminals at one trading house. Further, it should be understood that the example embodiments are not limited to trading houses. As illustrated in FIG. 1, an individual client terminal 106, being operated by one or more traders, may also connect to the exchanges in a similar fashion as the trading houses.

The term client terminal, as used herein, can include any computing terminal, including a personal computer, a handheld device, and other currently existing or later developed computing terminals. Further, it should be understood that a client terminal may connect to the gateways via wireless communication links, wireline communication links, or a combination thereof. In general, a client terminal, according to the example embodiments described hereinafter, is a computer that allows a trader to participate in the market hosted at the exchange, and uses software that creates specialized interactive trading screens on the client terminal. The range and quality of features available to the trader on his or her client terminal's screen may vary according to the specific software application being run on the client terminal. Among other functional features, a trading screen being run on a client terminal may enable traders to enter and execute orders, obtain market quotes, and monitor positions. However, it should be understood that, in addition to interactive trading screens, a client terminal may also run automated or semi-automated non-interactive types of trading applications.

The system shows two possible configurations, although any number of configurations is possible. In one configuration illustrated in FIG. 1, the trading house 102 is connected to the gateway 108 that communicates with the exchanges 118, 120, and 122 through gateways 112, 114, and 116. The assignee of the present invention sells one such gateway, referred to as TT Relay™, that may connect to multiple gateways. Additionally, the trading house 102 communicates with the exchange 124 through the gateway 110. It should be understood that more network devices, such as routers, may exist along the path between the trading house 102 and the exchanges 118-124.

In another configuration, the trading house 104 and the client terminal 106 are connected to the exchange 124 through the gateway 110. According to the second configuration, the trading house 104 and the client terminal 106 communicate with the exchange through one gateway. As with the first configuration, more network devices may exist along the path between the trading houses and exchanges. It should also be understood that there are many possible variations beside the system shown in FIG. 1. For example, the gateway 110 may be connected to the gateways 112-116 so that the trading house 104 and the client terminal 106 may connect with the exchanges 118-124. Alternatively, the gateway 110 may connect to the gateway 108 that then provides connections to the gateways 112, 114, and 116. Moreover, the gateway(s) may reside on the trading workstations, or it may be located on a separate physical device on a computer network. Similarly, a single physical device may provide more than one instantiation of a gateway. Each gateway, as is known in the art, may include one or more computers, or software programs, and may receive information from the host exchanges and send the information down to the client terminal 106. Preferably, each gateway receives data from the host exchanges and converts the received data to a format compatible with the protocols used on the client terminal 106. Alternatively, the conversion could be performed at the client terminal 106.

Each host exchange may provide different types of information, and may relay this information, or a portion thereof, collectively called a data feed, over a network to market participants at the client terminals. A data feed from one exchange may contain different information representing different tradable objects than another data feed from a second exchange. Further, a data feed coming from an exchange may include information related to all tradable objects being traded at that exchange. In such an embodiment, when a client terminal receives a data feed, a trading application on the client terminal may use the received data feed to extract data relevant to one or more tradable objects selected by a trader at the client terminal. Alternatively, the data feed provided from the exchange to a client terminal may include only data relevant to the tradable objects selected by a trader at the client terminal.

Data feeds may include information relating to prices and quantities of one or more tradable objects. For example, a data feed could provide data corresponding to quantities at inside market prices and/or data corresponding to quantity at different prices. The inside market is the highest bid price ("HBP") and the lowest ask price ("LAP") for a tradable object. Data feeds from some exchanges may also provide data related to the market depth. The market depth is each available pending bid and ask quantity, or any aggregation or combination thereof, entered at a particular price. The extent of the market depth available to a trader depends on the exchange. Some exchanges provide an infinite market depth, while others provide only quantities associated with the inside market and some may provide no market depth.

The data feed may also contain other types of market information such as the last traded price ("LTP"), the last traded quantity ("LTQ"), order information, and/or fill information for a tradable object. Additionally, some exchanges may also monitor traded prices for tradable objects being offered at the exchange, and may determine the highest traded price ("HTP") and the lowest traded price ("LTP") for each or some trading objects offered at the exchange during a trading day. In one embodiment, such exchanges may use data feeds to provide, to client terminals, the highest traded price and the lowest traded price for one or more trading objects. Alternatively, the exchanges may use special market update messages that are exclusively used to send the highest traded price and the lowest traded price to the client terminals. In such an embodiment, the exchange may send an update message every time a new highest or lowest traded price is detected for a tradable object.

A commercially available trading application that allows a user to trade in a system like that shown in FIG. 1 is X_TRADER® from Trading Technologies International, Inc. of Chicago, Ill. X_TRADER® also provides an electronic trading interface, referred to as MD Trader™, in which working orders and/or bid and ask quantities are displayed in association with a static axis of prices. However, the preferred embodiments are not limited to any particular product.

Portions of the X_TRADER® and the MD Trader™-style display are described in U.S. patent application Ser. No. 09/590,692, entitled "Click Based Trading With Intuitive Grid Display of Market Depth," filed on Jun. 9, 2000, and U.S. patent application Ser. No. 09/971,087, entitled "Click Based Trading With Intuitive Grid Display of Market Depth and Price Consolidation," filed on Oct. 5, 2001, which issued as U.S. Pat. No. 7,127,424 on Oct. 24, 2006, the contents of both are incorporated herein by reference. Moreover, the trading application may implement tools for trading tradable objects that are described in U.S. patent application Ser. No. 10/125,894, filed on Apr. 19, 2002, entitled "Trading Tools for Electronic Trading," which issued as U.S. Pat. No. 7,389, 268 on Jun. 17, 2008, the contents of which are incorporated herein by reference.

The example embodiments for displaying market information, including the highest traded price and/or the lowest traded price, related to a tradable object will be described below in reference to the MD Trader™-style display that displays information, such as orders to buy or orders to sell, in association with price levels arranged along a common static axis or scale of prices. The quantities associated with orders to buy are preferably displayed in a bid display region and quantities associated with orders to sell are preferably displayed in an ask display region. These quantities can be displayed using any type of indicator. For example, the indicator can be a graphical representation of quantity (e.g., colors, bars, etc.) or can simply be a number. The price levels are fixed in relation to the bid and ask display regions such that the indicators displayed in these regions can move relative to the static price axis. It should be noted that the static axis of prices is not immovable relative to the display (e.g., the screen). For example, which portion of the static axis that is being viewed can be changed by scrolling up or down the axis or by entering a repositioning command. One embodiment using this type of display system displays market information with respect to a vertical axis so that the market information fluctuates logically up and down relative to the axis as the market prices fluctuate. It should be understood that while the example embodiments for displaying the highest and lowest traded prices of a tradable object are described in reference to the MD Trader™-style display, the present invention is not limited to any particular display and could be used with different or equivalent displays. Further, it should be understood that many modifications to the MD Trader™ display are possible as well. For example, information related to a tradable object may be displayed on horizontally relative to a horizontally oriented axis, n-dimensionally, or in any other fashion.

In a fast moving market, where varying price levels are trading (i.e., bids and offers entering the market are being matched at different prices), it is beneficial for a trader to be able to quickly enter orders and quickly see and analyze market information. FIG. 2 illustrates a display 200 that allows a trader to quickly enter orders at specific price levels by clicking next to a static axis of prices, displayed as a static column, and to quickly and easily see information such as working orders. The display 200 is the MD Trader™-style display; however, some of the fields available on the typical MD Trader™ have been omitted and are not described in reference to FIG. 2. A typical MD Trader™-style display is described in greater detail in U.S. patent application Ser. No. 09/590,692, filed on Jun. 9, 2000, which issued as U.S. Pat.

No. 6,772,132 on Aug. 3, 2004, the contents of which are fully incorporated herein by reference.

The display shown in FIG. 2 includes a working orders column 202, a bid quantity ("Bid Qty") column 204, an ask quantity ("Ask Qty") column 206, and a price column 208. In the preferred embodiment, the three columns 202, 204, 206 are shown in different colors so that a trader can easily distinguish them. Further, it should be understood that a trader has the ability to control the arrangement of the columns on the display. For example, the Bid Qty column 204 could be positioned on the left side of the price column 208, while the Ask Qty column 206 could be positioned to the right of the price column 208. However, it should be understood that other arrangements are possible as well. The Bid Qty column 204 displays bid quantities, and the Ask Qty column 206 displays ask quantities. The representative prices for a given trading object are shown in the price column 208. As mentioned in reference to preceding paragraphs, the price column 208 includes a static axis of prices. It should be understood that the static axis of prices could be displayed in any manner, including in a row, on any angle, or n-dimensionally, without departing from the invention. Alternatively, the prices on the static axis of prices do not need to be displayed.

The representative prices for a given tradable object are illustrated in the price column 208 and incremented in "ticks," where a tick is the minimum change in a price value that is set by the exchange for a tradable object. It should be understood that prices can be displayed as ticks, as multiples of ticks, or in any other fashion. In the embodiment illustrated in FIG. 2, the column does not list the whole price (e.g., 99.89), but only the last two digits (e.g., 89). Other price display conventions may alternatively be used, as long as price information is conveyed to the user. In an alternative embodiment, the static axis of prices may include no numerical values at all. In such an embodiment, the market information may be displayed relative to one another along a scale or axis representing particular prices using particular colors or using other methods. Further, alternatively, prices could be consolidated, and the display could show consolidated prices so that for instance, a cell could correspond to a range of prices instead of one price. More information on price consolidation may be found in U.S. patent application Ser. No. 09/971,087, filed on Oct. 5, 2001, "Click Based Trading with Intuitive Grid Display of Market Depth and Price Consolidation," which issued as U.S. Pat. No. 7,127,424 on Oct. 24, 2006, the contents of which are fully incorporated herein by reference.

Referring back to FIG. 2, the inside market is 90 (best bid price) and 91 (best ask price). There is a quantity of 150 (best bid quantity) at 90 and a quantity of 120 (best ask quantity) at 91. Three additional market depth levels are also shown in FIG. 2. Specifically, the first, second, and third additional market depth levels are 180, 120 and 400 (ask quantities) at 92, 93, and 94 (ask prices), and 100, 150, and 25 (bid quantities) at 89, 88, and 87 (bid prices). The working order column 202 displays the current status of the trader's orders. The status of each order is displayed in the price row where it was entered. For example, in the working orders column 202, in a cell corresponding to the static price 90, the number next to "B" indicates the number of the trader's lots that have been bought at the price in the specific row, i.e., price 90. Referring to the lower cell in the working orders column 202, in a cell corresponding to the static price 89, the number next to W indicates the number of the trader's ordered lots that are in the market, but have not been filled, i.e., the system is working on filling the order. Although not shown, the working orders column 202 may also include current status of trader's sale orders. The sale orders could be indicated in a cell including "S" and "W" and the corresponding numbers. A non-zero number next to "S" would indicate the number of trader's ordered lots that have been sold at the price in the specific row. The number next to "W" in such an order would indicate the number of the trader's ordered lots that are in the market, but have not been filled—i.e., the system is working on filling the order.

It should be understood that the same information and features can be displayed and enabled in a horizontal or other fashion. Just as the market ascends and descends the vertical axis in the embodiment illustrated in FIG. 2, the market will move left and right in the horizontal display, while the same data and the same information gleaned from the dynamic display of the data is provided. It should be understood that other orientations can be used to dynamically display the data and such orientations are intended to come within the scope of the present invention.

The specific features of the embodiment of a display as in FIG. 2 are an example of one embodiment of a screen display that can be used with the present invention. The present invention is not limited, however, to a screen display utilized each of these features.

Maximum and Minimum Traded Price Indicators

Figure 3:
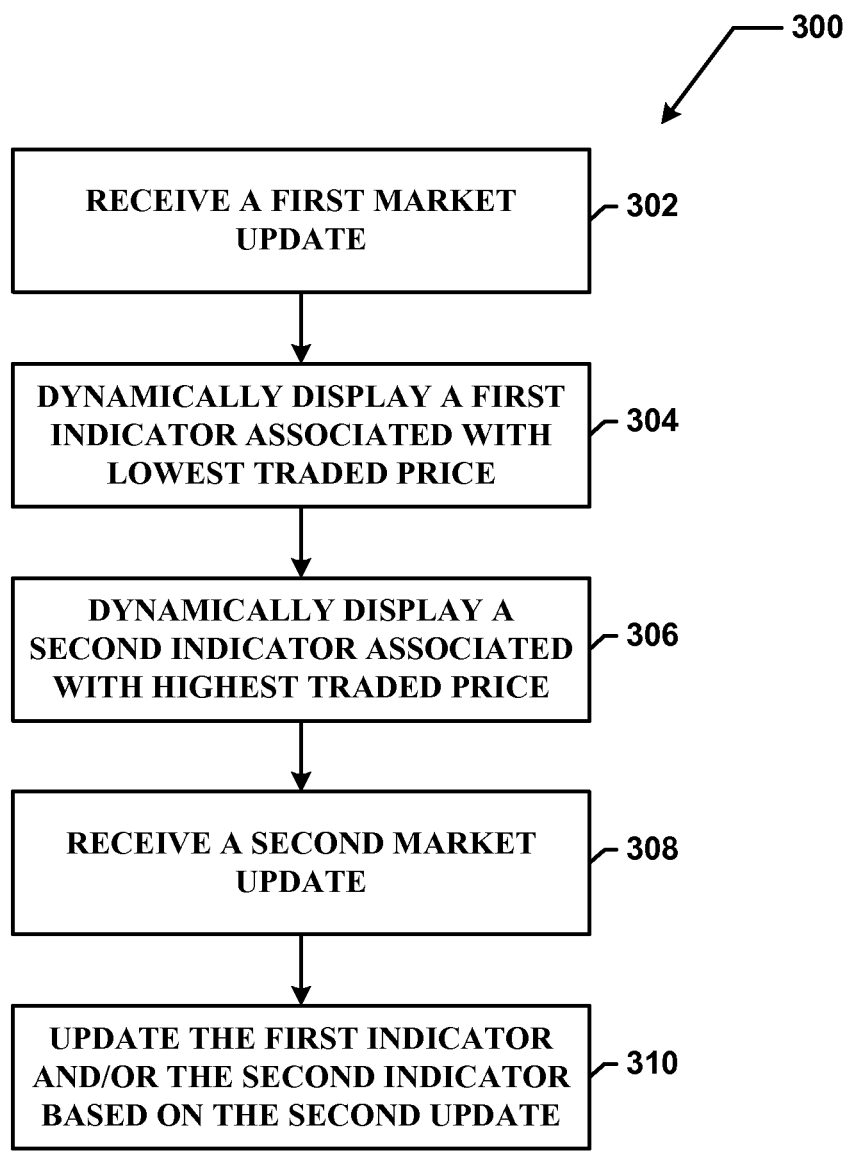
FIG. 3 is a flow chart illustrating one process for displaying the highest and lowest traded prices on the display of FIG. 2.

FIG. 3 is a flow diagram 300 illustrating an example method for displaying market information associated with a tradable object based on market updates received from an exchange. More specifically, the market information includes the lowest traded price and the highest traded price of a tradable object that are determined based on market updates provided by an exchange. It should be understood that the flow diagram 300 illustrates only example steps that may be taken to display the lowest and highest traded prices associated with a tradable object, and more or fewer steps may be included in the flow diagram, and more or fewer steps may occur in one or more orders.

Referring to the flow chart in FIG. 3, at step 302, a client terminal receives a first market update from an exchange. In one embodiment, a market update may have a format of a message and may include the inside market, quantities, along with the highest traded price and the lowest traded price associated with a tradable object. Alternatively, an exchange may use one or more separate market update messages specifically designed to exclusively send the highest and lowest traded prices whenever a change in one of these prices is detected at the exchange. It should be understood that when a gateway associated with the client terminal receives the first market update from the exchange, the gateway may convert the received data into a format compatible with protocols used on the client terminal.

When the client terminal receives the first market update, at step 304, a trading application on the client terminal uses the information specified in the received update to dynamically display a first indicator reflecting the lowest traded price of a tradable object. According to an example embodiment, the first indicator is displayed on the MD Trader™-style display, such as the display illustrated in FIG. 2, in relation to a static axis of prices, the example embodiments of which will be described in greater detail in reference to subsequent figures.

At step 306, the trading application on the client terminal uses the information specified in the first update to dynamically display a second indicator reflecting the highest traded price of the tradable object. Similarly to the first indicator, the second indicator is also displayed in relation to the static axis of prices associated with the tradable object. It should be understood, and as explained in reference to FIG. 2, the MD Trader™-style display may also display other information related to the tradable object, including, for example, a quantity indicator associated with at least one order for the tradable object, such as at least one order to buy and/or sell the tradable object. In such an embodiment, one or more quantity indicators are also displayed in relation to the static axis of prices.

At step 308, the trading application on the client terminal receives a second, or subsequent, market update from the exchange. Depending on formats and types of messages being used by exchanges to convey the highest and lowest traded prices of tradable objects, different steps may be carried out at a gateway or the trading application at the client terminal to determine if the highest traded price and/or the lowest traded price have changed compared to the prices associated with the first and second indicators. In an embodiment in which an exchange provides the highest/lowest traded price information in a market update including the inside market, the market update message may include a special flag indicating that a new highest or lowest traded price is specified in the message. Alternatively, if an exchange monitors the highest/lowest traded prices for the tradable object and sends a special update message only if the new highest/lowest traded price is detected, then, when the trading application at the client terminal receives such a message, the trading application may simply use the information specified in the message to determine that a new highest/lowest traded price has been reached. Further, for example, an exchange may use two separate update messages, one of which used to send the highest traded price updates, and another to send the lowest traded price updates.

Further, alternatively, an exchange may only provide the last traded price of a tradable object. In such an embodiment, gateway or a trading application on a client terminal may determine a first highest traded price and a first lowest traded price based on the first and second last traded prices received from an exchange (assuming that the first two last traded prices have different values). In an embodiment in which the gateway makes such a determination, the gateway may then send this information to the client terminal. The first highest and lowest traded prices may then be displayed on a display using a first indicator and a second indicator. In such an embodiment, once the first and second indicators are displayed, the gateway or the trading application on the client terminal may then use a next update message received from the exchange to determine if the last traded price specified in the received message corresponds to a new highest or lowest traded price of the tradable object. In one embodiment, the gateway or the trading application may determine a relative price level of the received last traded price compared to the lowest/highest traded prices corresponding to the first and second indicators. If the last traded price is lower than the traded price corresponding to the first indicator (the lowest traded price), the gateway or the trading application may determine that a new lowest traded price has been received for the tradable object. If the last traded price is higher that the traded price corresponding to the second indicator (the highest traded price), the gateway or the trading application may determine that a new highest traded price has been received for the tradable object. It should be understood that different embodiments are possible as well.

At step 310, the trading application on the client terminal updates the first and second indicators based on price information specified in the second, or subsequent, update message. As described in the preceding paragraphs, the functions performed on the gateway or the trading application to determine if a new highest/lowest traded price has been reached may depend on the format and information contained in the update message received from the exchange. Irrespectively of what operations are performed, when the new lowest traded price is detected, the first indicator is dynamically updated, i.e., repositioned to reflect the new lowest traded price. Similarly, when the new highest traded price is detected, the second indicator is repositioned to reflect the new highest traded price.

It should be understood that a first indicator and a second indicator reflect the lowest traded price and the highest traded price over a predetermined period of time. In one embodiment, the predetermined period of time, by default, may be set to a trading day. In such an embodiment, the first trading indicator and the second trading indicator, at the beginning of a trading day, may be set to the previous day settlement highest traded price and the lowest traded price. Alternatively, the trading application may wait until it receives data related to the first trades in a particular trading day, i.e., data including the highest traded price and the lowest traded price, or data including information that can be used at the trading application to determine the highest traded price and the lowest traded price.

However, the predetermined period of time does not necessarily have to be set to the entire trading day. It should be understood that the predetermined period of time may be user configurable. For example, a user may want to view the highest and lowest traded prices over a predetermined time interval, such as over a specific hour during a trading day. In one embodiment, a user could preprogram such a specific time interval at any time during a trading day. In such an embodiment, the trading application may send the user request to a gateway, for example, and the gateway may use the last traded prices being received from the exchange to determine new high or low traded prices during the time interval specified by the user. In such an embodiment, when a new high or low is detected on the gateway, the gateway may send that information to the client terminal via a data feed or using a predetermined message for sending high and low updates. Once the information is received at the client terminal, the client terminal may automatically set the indicators corresponding to the highest and lowest traded prices of a tradable object and may update the indicators throughout the predetermined time interval based on the updates provided by the gateway. Further, in such an embodiment, the indicators reflecting the highest and lowest traded prices over the time period specified by the user may be displayed instead of or in addition to indicators reflecting the highest and lowest traded prices during a trading day. In such an embodiment, to differentiate the indicators related to the highest/lowest traded prices associated with the entire trading day and indicators related to the highest/lowest traded prices monitored over a time period specified by a user, the indicators may be displayed using different colors. Alternatively, different types of indicators configurable by a user could also be used instead.

Further, in an alternative embodiment, a user could preset a movable time window to monitor the highest and lowest traded prices during the preset time period. For example, instead of monitoring the entire trading day, or a preset period of time, such as a specific hour or a number of hours during a trading day, a user could preset, for instance, a movable ten minutes time window. In such an embodiment, the indicators would reflect highest and lowest traded prices during the first ten minutes from the specified start time, and then would be reset, and reflect the prices for the next ten minutes, and so on.

It should be understood that the method of determining the highest and lowest traded prices based on data received from the exchange could be performed on the client terminal or the gateway, or partially performed on the gateway and the client terminal. Determining the highest and lowest traded prices on the gateway may turn out beneficial when a client terminal has little processing power.

Further, it should be understood that the present invention is not limited to displaying the highest and lowest traded prices associated with a single tradable object. In an alternative embodiment, the highest and lowest traded prices may be displayed for a spread. Spread trading is the buying and/or selling of two or more tradable objects, and a spread trade could involve buying two or more tradable objects, buying and selling two or more tradable objects, selling two or more tradable objects, or some combination thereof. According to an example embodiment, when a user selects individual tradable objects underlying the spread, i.e., legs of the spread, an automatic spreader may calculate an overall spread based on data feeds associated with each leg. Further, in such an embodiment, the automatic spreader may calculate the highest traded price and the lowest traded price of the spread using highest and lowest traded prices associated with each tradable object of the spread. The automatic spreader and methods for calculating spread prices are described in greater detail in U.S. patent application Ser. No. 10/137,979, filed on May 3, 2002, entitled "System and Method for Performing Automatic Spread Trading," which issued as U.S. Pat. No. 7,437,325 on Oct. 14, 2008, the contents of which are incorporated herein by reference.

In accordance with a preferred embodiment, the highest and lowest traded prices associated with a tradable object during a predetermined period of time are displayed using two visual indicators. It should be understood that any type of indicator may be used as long as it is recognizable by a user as the highest and/or lowest traded price of a tradable object during a predetermined period of time. For example, the indicators may be graphical indicators, color indicators, or markers. Further, each indicator may include an associated numerical value. Alternatively, or additionally, each indicator could be designated with a letter or word, such as "H," "L," "Max," or "Min." In one embodiment, the two indicators may be of the same type. In an alternative embodiment, two different indicators may be used to illustrate the highest and lowest traded prices of a tradable object.

Further, in accordance with a preferred embodiment, when a new highest or lowest traded price is reached, a sound alert may be generated to notify a user of the new high or low. In such an embodiment, it should be understood that a user may pre-configure sound indicators reflecting the new high or low via a graphical interface, such as a popup window enabling the user to select from a number of possible audio indicators. Further, it should be understood that a voice synthesizer could be used to notify the user of the new high or low, to play "A new high has been reached," for example, when the new highest traded price is reached. It should be understood that different embodiments could also be used, and the present invention is not limited to any particular sound indicator.

As noted above, items of interest in the user interface may be color-coded or highlighted using color or gray scale shades. In a preferred embodiment, the user interface is of the type illustrated in FIG. 2 having market data displayed in relation to a static axis of prices, such as the MD_TRADER™ style display. In MD_TRADER™, the highest and lowest traded price of a tradable object during a predetermined period of time may be presented as a pair of indicator bars in the form of two horizontal lines.

Figure 4:
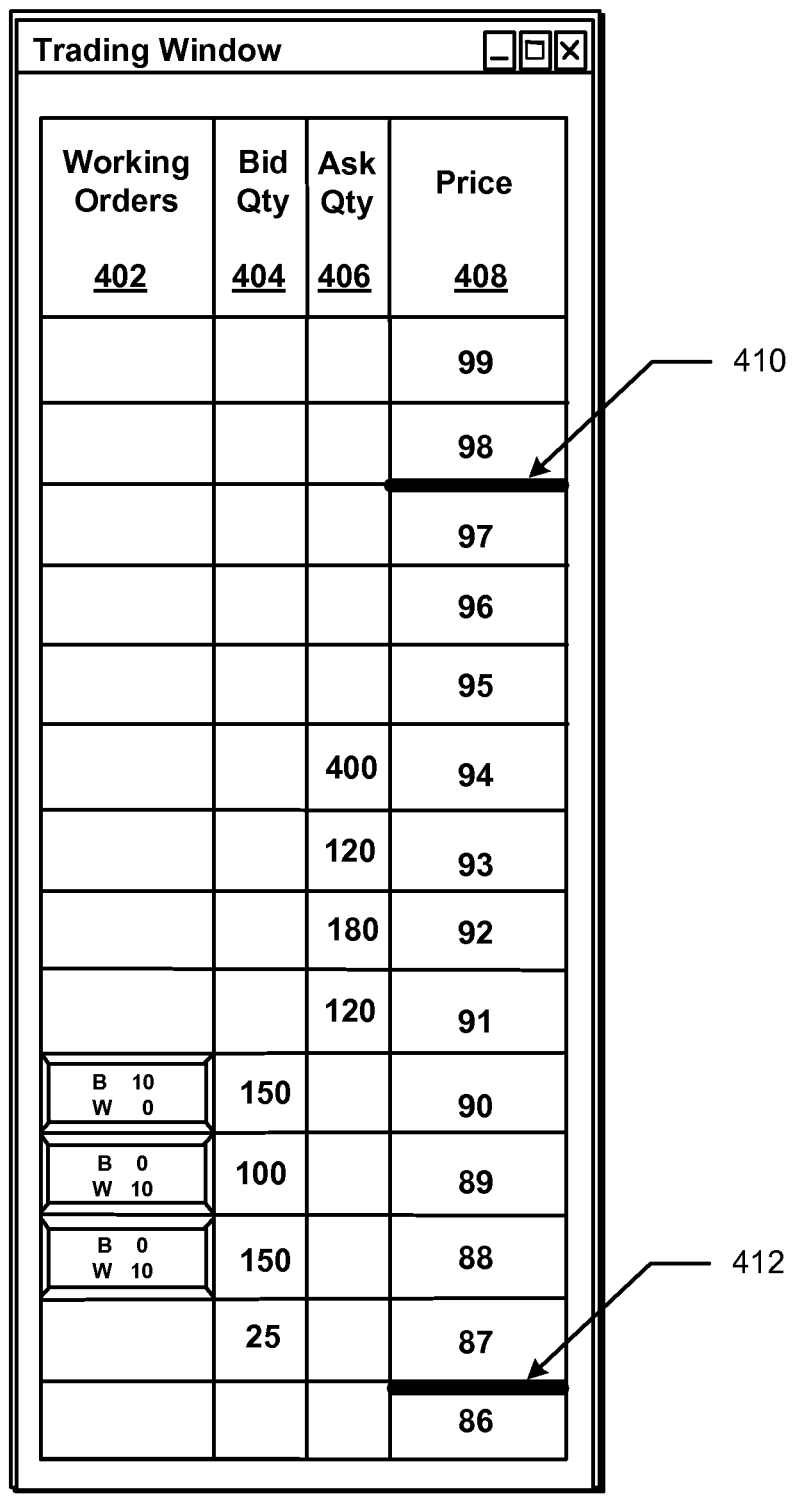
FIG. 4 is a block diagram illustrating one example display showing two price indicators in the form of horizontal lines in accordance with one embodiment.

FIG. 4 is an example display showing two price indicators in the form of horizontal lines. In FIG. 4, two horizontal lines 410 and 412 are displayed in a price column 408 at levels corresponding to the highest and lowest traded prices, respectively. Thus, according to an embodiment illustrated in FIG. 4, the highest traded price for a tradable object is 97, and the lowest traded price is 87. It should be understood that the horizontal line indicators may be color indicators and may be displayed using the same or different colors. For example, the highest traded price indicator 410 may be displayed using one color, such as yellow, and the lowest traded price indicator 412 may be displayed using another color, such as red. However, it should be understood that different colors could also be used. In one embodiment, the trading application preferably allows a user to change color designation in accordance with the user's preference. Further, it should be understood that the horizontal line indicators are not necessarily displayed in the price column 408, and could be displayed in relation to the price column. In one embodiment, the price indicators 410 and 412 may be displayed adjacent to the price column 408, for example. The indicator horizontal bars 410 and 412 move in relation to the static axis of prices in the price column 408 based on the highest and lowest traded price movements during a predetermined period of time. Thus, for example, if a new highest traded price is reached for a tradable object, the price indicator 410 is moved to a new price level reflecting the new highest traded price. As mentioned in reference to preceding figures, the indicator updates are done based on market updates related to the tradable object received from the exchange.

Further, if a price consolidation mechanism is used, it should be understood that the price indicators corresponding to the highest and lowest traded prices may be displayed in a cell corresponding to a range of prices including the highest or lowest traded price. For example, if a cell corresponds to prices ranging from 89-91, and the highest traded price is 90, then a highest traded price indicator may be displayed in relation to the middle portion of the cell. Alternatively, the price indicator could be displayed anywhere within the cell including the highest traded price, thus, only indicating that the highest traded prices is somewhere within the ranged of prices represented by the cell.

Figure 5:
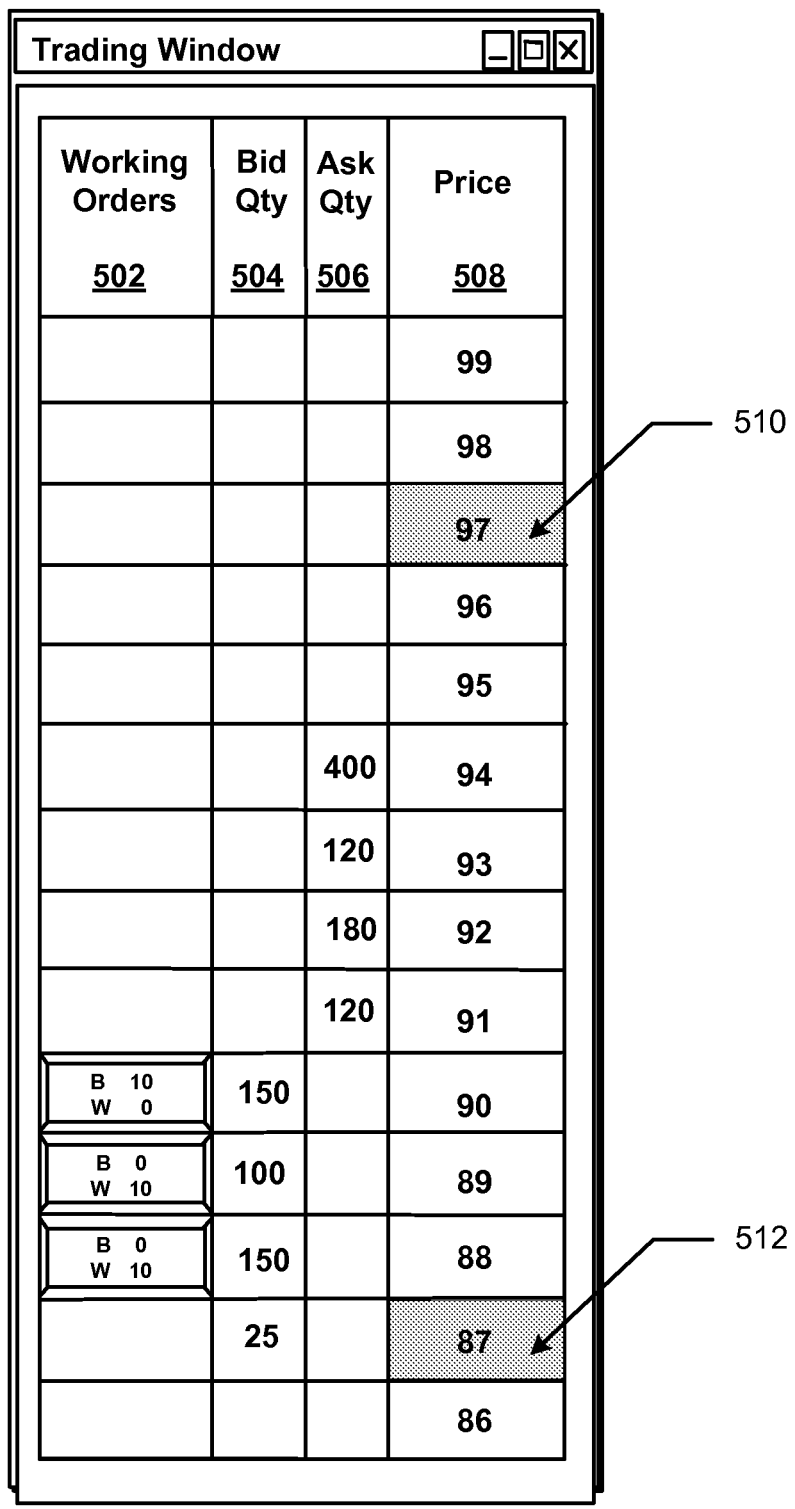
FIG. 5 is a block diagram illustrating one example display showing two price indicators in the form of highlighted cells in accordance with one embodiment.

In an alternative embodiment, the highest and lowest traded prices may be presented as highlighted or partially highlighted cells on a static axis of prices. FIG. 5 is an example display showing two price indicators in the form of highlighted cells on a static axis of prices. As illustrated in FIG. 5, the highest traded price and the lowest traded price associated with a tradable object are displayed on the example display as highlighted price cells in the price column 508, as shown at 510 and 512. It should be understood that each cell may be highlighted in a particular color that may be configurable by a user, for example. Alternatively, a particular highlighting pattern may be used to highlight the cells corresponding to the highest and lowest traded prices. It should be understood that a highlighting pattern used in each cell may be different or the same, and it may be configurable by a user. Further, it should be understood that only a portion of each cell may be highlighted.

Figure 6:
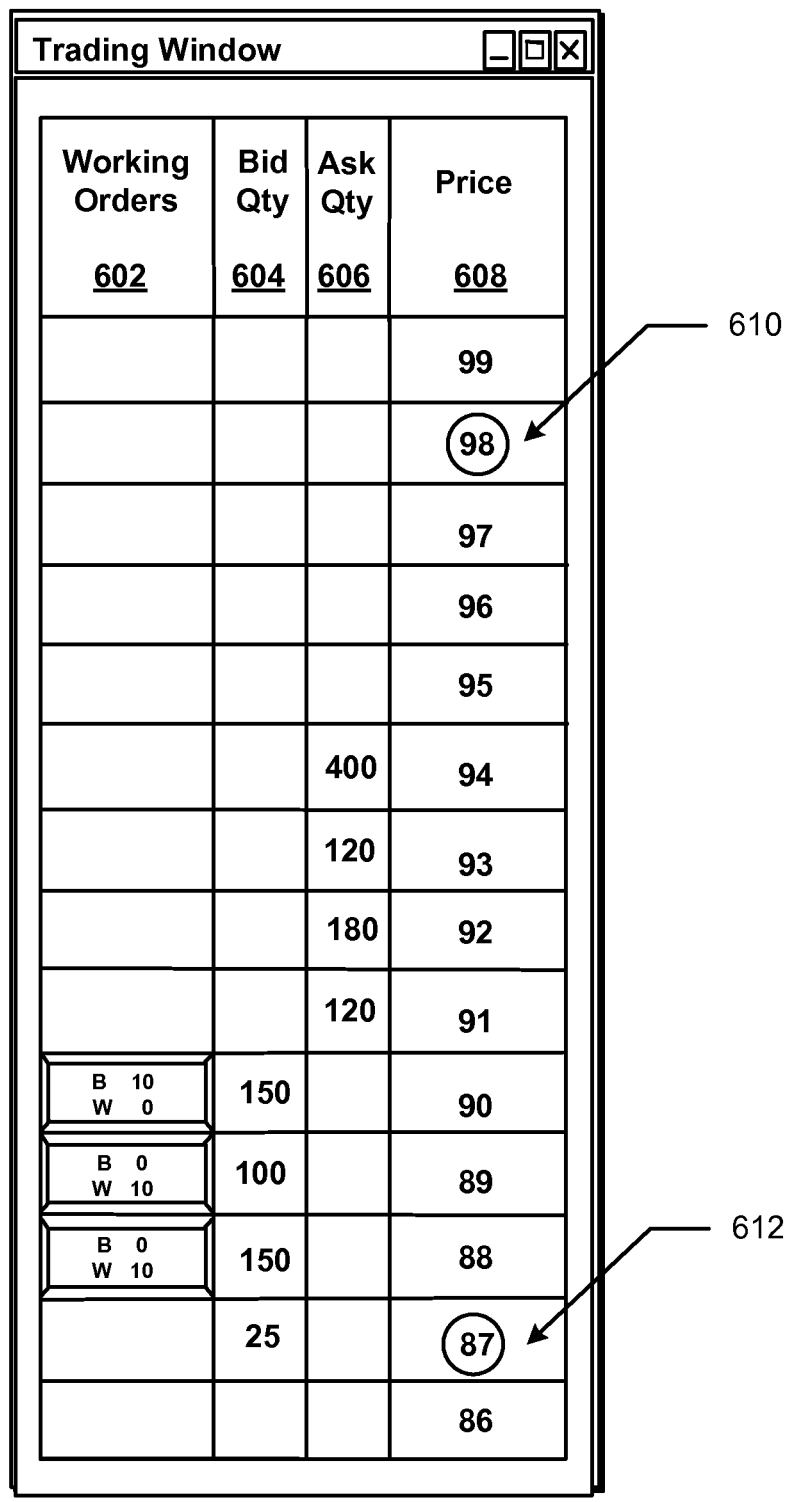
FIG. 6 is a block diagram illustrating one example display showing two price indicators in the form of graphical symbols in accordance with one embodiment.

The indicators related to the highest and lowest traded prices may be displayed in any format that is suitable and recognizable by a user. For example, graphical symbols may be used as indicators of the highest and lowest traded prices. FIG. 6 is an example display showing price indicators in the form of graphical symbols. FIG. 6 shows prices corresponding to the highest traded price and the lowest traded price in the price column 610 surrounded by colored, shaded, or highlighted circles, as shown at 610 and 612. However, it should be understood that different types of graphical indicators could also be used, such as boxes surrounding respective prices, or graphical indicators displayed next to the prices in the price cells. Further, it should be understood that graphical indicators could occupy either a portion or the entire price cell corresponding to the highest or lowest traded price. In alternative embodiment, graphical indicators may be displayed in relation to a static axis of prices in the price column 608, such as next to the price column 608.

Figure 7:
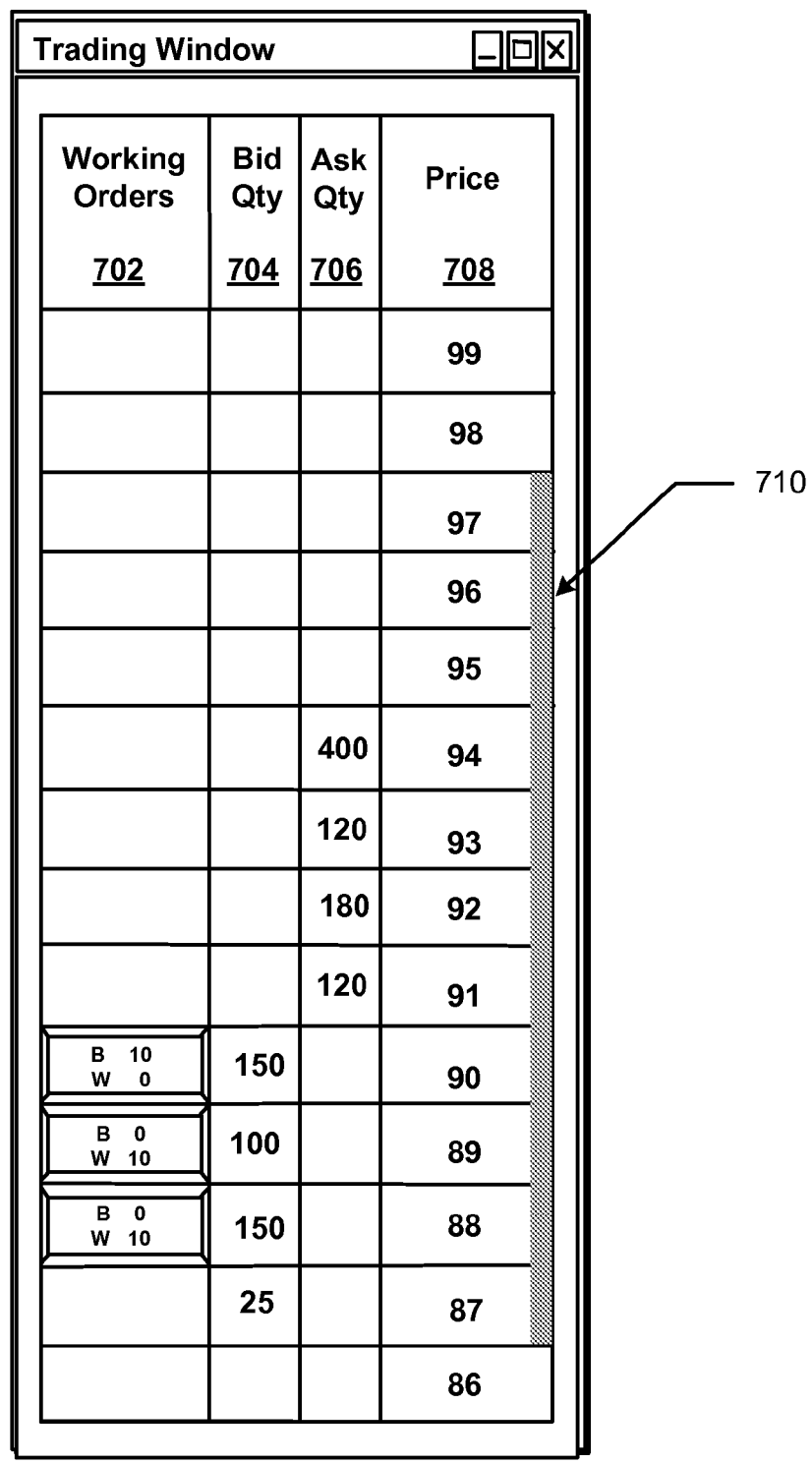
FIG. 7 is a block diagram illustrating one example display showing an indicator column as means for displaying a price indication in accordance with one embodiment.

FIG. 7 is an example display showing an indicator column related to the highest and lowest traded price of a tradable object. In the embodiment illustrated in FIG. 7, a column indicator 710 is displayed in the price column 708 and indicates a range of prices between the lowest and highest traded prices. The column indicator 710 may be a colored, highlighted or shaded column. FIG. 7 illustrates the column indicator 710 occupying only a portion of each price cell between the highest traded price and the lowest traded price. However, in an alternative embodiment, entire cells between the highest traded price and the lowest traded price may be highlighted as well. Further, alternatively, the column indicator may be displayed adjacent to the price column 708.

Figure 8:
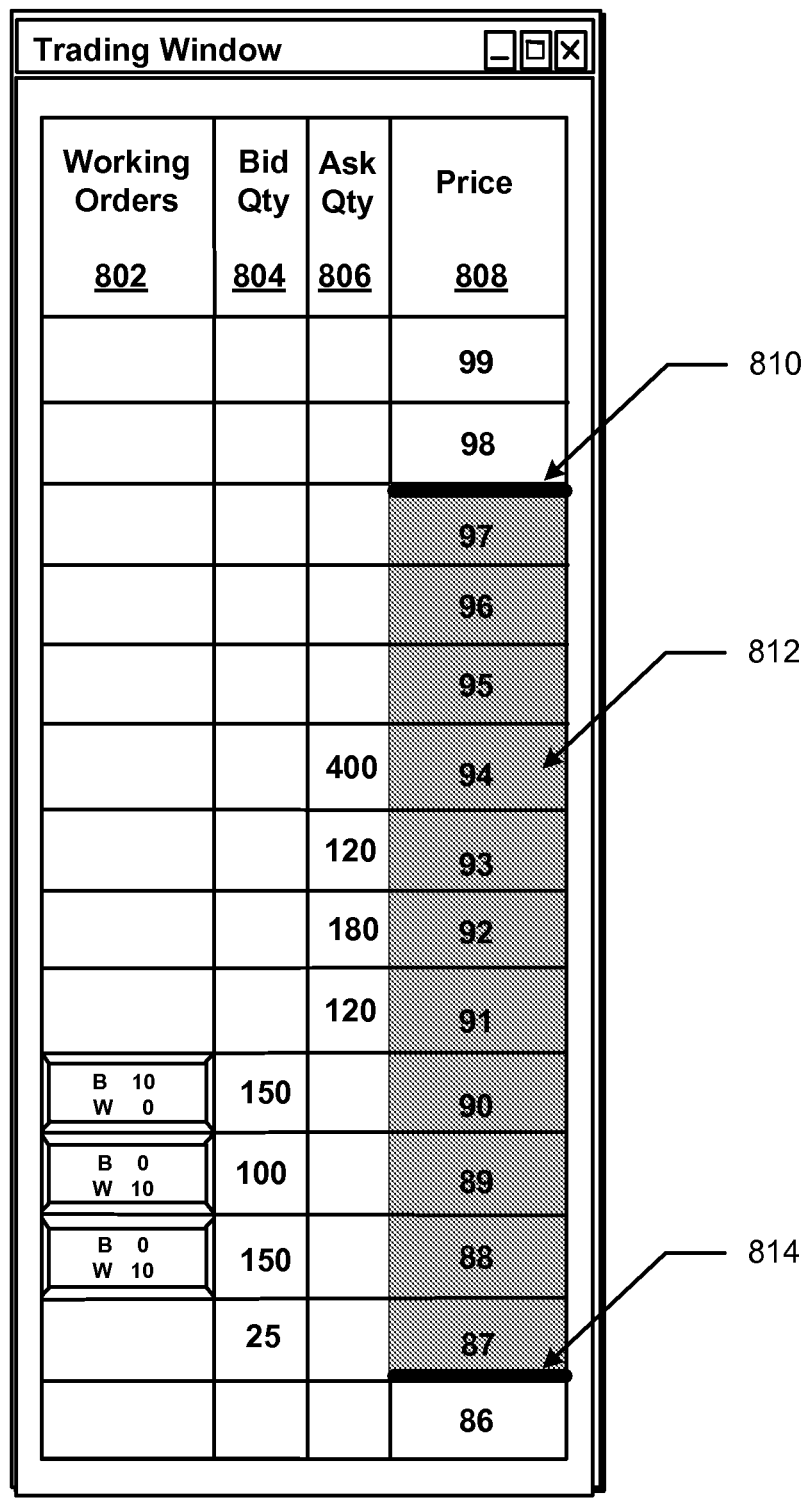
FIG. 8 is a block diagram illustrating one example display showing a combination of two price indicators in accordance with one embodiment.

In view of the embodiments described above, it should be understood that the type of indicators relating to the highest and lowest traded prices may be selectable by a user. For instance one or more methods for displaying price indicators could be combined as well. In one embodiment, the method of displaying the highest and lowest traded prices using horizontal line indicators could be combined with the price column indicator. FIG. 8 is an example display showing two price indicators in the form of horizontal lines and further showing a highlighted indicator column. In FIG. 8, two horizontal lines 810 and 814 are displayed in the price column 808 at levels corresponding to the highest traded price and the lowest traded price. Further, a range of prices between the highest and lowest traded prices is highlighted using a highlighted indicator column 812.

It should be understood that different embodiments are possible as well, and the present invention is not limited to the described types of indicators. Further, it should be understood that user may configure price indicator to reflect prices related to, but not equal to, the highest and traded price. As an example, price indicators may reflect a certain percentage, or percentages, of the highest and lowest traded prices of a tradable object. Those skilled in the art will recognize that many other embodiments within the scope of the present invention are also possible.

In accordance with one embodiment, the graphical user interface for a trading application provides means for indicating that an item of interest is outside the viewable range of display. For example, due to market movement, indicators of the highest and lowest traded price may be outside the viewable range of display. According to an example embodiment, a user has the ability to cause the display to shift up or down so that the user may view the indicator that is outside the viewable area. In one embodiment, the out of range indicator is an arrow or similar pointing indicator, which indicates to the user that an item of interest, such as an indicator of the highest traded price or the lowest traded price, lies outside the viewable area, and further indicates the direction in which the viewable area needs to move in order for the user to view the item of interest. More information on means for indicating that an item of interest is outside the viewable area may be found in U.S. patent application Ser. No. 10/125,894, entitled "Trading Tools for Electronic Trading," which issued as U.S. Pat. No. 7,389,268 on Jun. 17, 2008, fully incorporated herein by reference.

It should be understood that the above description of the preferred embodiments, alternative embodiments, and specific examples, are given by way of illustration and should not be viewed as limiting. Further, many changes and modifications within the scope of the present embodiments may be made without departing from the spirit thereof, and the present invention includes such changes and modifications.

Further, it will be apparent to those of ordinary skill in the art that methods involved in the system and method for displaying market information relating to a tradable object may be embodied in a computer program product that includes one or more computer readable media. For example, a computer readable medium can include a readable memory device, such as a hard drive device, CD-ROM, a DVD-ROM, or a computer diskette, having computer readable program code segments stored thereon. The computer readable medium can also include a communications or transmission medium, such as, a bus or a communication link, either optical, wired or wireless having program code segments carried thereon as digital or analog data signals.

The claims should not be read as limited to the described order or elements unless stated to that effect. Therefore, all embodiments that come within the scope and spirit of the following claims and equivalents thereto are claimed as the invention.

What is claimed:

1. A method comprising:

displaying, by a computing device, a plurality of axially aligned price levels, each price level of the plurality of axially aligned price levels including an indicator identifying a price of a tradeable object traded at an electronic exchange according to data received from the electronic exchange for the tradeable object and being configured for receiving a user input from a user input device to select the price level of the plurality of axially aligned price levels and set an order to be submitted to the electronic exchange to trade the tradeable object with the identified price of the price level;

dynamically displaying, by the computing device, an order indicator for a price of at least one order for the tradeable object pending at the electronic exchange, the order indicator being displayed at a price level along the plurality of axially aligned price levels according to the price, where the order indicator changes locations relative to the plurality of axially aligned price levels according to the data received from the electronic exchange for the tradeable object;

dynamically displaying, by the computing device, a lowest traded price indicator at a lowest traded price level of the plurality of axially aligned price levels for a lowest traded price for a user-selected time period, where the lowest traded price indicator changes locations relative to the plurality of axially aligned price levels according to changes in the lowest traded price for the user selected time period determined based on the data received from the electronic exchange for the tradeable object; and dynamically displaying, by the computing device, a highest traded price indicator at a highest traded price level of the plurality of axially aligned price levels for a highest traded price for the user-selected time period, where the highest traded price indicator changes locations relative to the plurality of axially aligned price levels according to changes in the highest traded price for the user-selected time period determined based on the data received from the electronic exchange for the tradeable object, where the indicator of each price level of the plurality of axially aligned price levels that identifies the price of a tradeable object traded at the electronic exchange according to data received from the electronic exchange for the tradeable object is different than the order indicator, the lowest traded price indicator and the highest traded price indicator.

2. The method of claim 1, further comprising dynamically displaying a column indicator by the computing device, the column indicator being displayed relative to each price level of the plurality of axially aligned price levels between the lowest traded price level of the plurality of axially aligned price levels and the highest traded price level of the plurality of axially aligned price levels.

3. The method of claim 2 where the column indicator changes relative to the plurality of axially aligned price levels between the lowest traded price level of the plurality of axially aligned price levels and the highest traded price level of the plurality of axially aligned price levels according to changes in at least one of the lowest traded price and the highest traded price.

4. The method of claim 1 further comprising determining, by the computing device, the a lowest traded price for the tradeable object for the user-selected time period based on at least one of a last traded price received from the electronic exchange and a lowest traded price received from the electronic exchange, where the lowest traded price indicator is movable relative to the plurality of axially aligned price levels according to at least one the last traded price received from the electronic exchange and the lowest traded price received from the electronic exchange.

5. The method of claim 1 further comprising determining, by the computing device, a highest traded price for the tradeable object for the user-selected time period based on at least one of the last traded price received from the electronic exchange and a highest traded price received from the electronic exchange where the highest traded price indicator is movable relative to the plurality of axially aligned price levels according to at least one the last traded price received from the electronic exchange and the highest traded price received from the electronic exchange.

6. The method of claim 1 where the order indicator represents a quantity available for trading.

7. The method of claim 6 where the order indicator comprises any of a graphical indicator, a numerical indicator, a color-coded indicator, and combinations thereof.

8. The method of claim 1 where the order indicator represents any of a current bid, a current ask, a highest bid, and a lowest ask.

9. The method of claim 1 where a range of the plurality of axially aligned price levels is adjustable according to a repositioning command.

10. The method of claim 1, further comprising displaying an order entry region aligned with the plurality of axially aligned price levels, the order entry region having a plurality of locations for receiving commands for submitting orders for trading, where each location of the plurality of locations corresponds to at least one of the plurality of axially aligned price levels.

11. The method of claim 2, further comprising moving the lowest traded price indicator from the lowest traded price level to an updated lowest traded price level of the plurality of axially aligned price levels in response to receipt of an updated last traded price being lower than the lowest traded price of the tradeable object, where the column indicator is displayed relative to each price level of the plurality of axially aligned price levels between the updated lowest traded price level of the plurality of axially aligned price levels and the highest traded price level of the plurality of axially aligned price levels.

12. The method of claim 2, further comprising moving the highest traded price indicator from the highest price level to an updated highest traded price level of the plurality of axially aligned price levels in response to receipt of an updated last traded price being higher than the highest traded price of the tradeable object, where the column indicator is displayed relative to each price level of the plurality of axially aligned price levels between the lowest traded price level of the plurality of axially aligned price levels and the updated highest traded price level of the plurality of axially aligned price levels.

13. A non-transitory computer readable medium having executable instructions stored thereon, which when executed by a processor, cause the processor to execute acts comprising:

displaying a plurality of axially aligned price levels, each price level of the plurality of axially aligned price levels including an indicator identifying a price of a tradeable object traded at an electronic exchange according to data received from the electronic exchange for the tradeable object and being configured for receiving a user input from a user input device to select the price level of the plurality of axially aligned price levels and set an order to be submitted to the electronic exchange to trade the tradeable object with the identified price of the price level;

dynamically displaying an order indicator for a price of at least one order for the tradeable object pending at the electronic exchange, the order indicator being displayed at a price level along the plurality of axially aligned price levels for the price, where the order indicator changes locations relative to the plurality of axially aligned price levels according to the data received from the electronic exchange for the tradeable object;

dynamically displaying a lowest traded price indicator at a lowest traded price level of the plurality of axially aligned price levels for a lowest traded price for a user-selected time period, where the lowest traded price indicator changes locations relative to the plurality of axially aligned price levels according to changes in the lowest traded price for the user-selected time period determined based on the data received from the electronic exchange for the tradeable object; and dynamically displaying a highest traded price indicator at a highest traded price level of the plurality of axially aligned price levels for a highest traded price for the user-selected time period, where the highest traded price indicator changes locations relative to the plurality of axially aligned price levels according to changes in the highest traded price for the user-selected time period determined based on the data received from the electronic exchange for the tradeable object, where the indicator of each price level of the plurality of price levels that identifies the price of a tradeable object traded at the electronic exchange according to data received from the electronic exchange for the tradeable object is different than the order indicator, the lowest traded price indicator and the highest traded price indicator.

14. The non-transitory computer readable medium of claim 13 where the acts further comprise dynamically displaying a column indicator, the column indicator being displayed relative to each price level of the plurality of axially aligned price levels between the lowest traded price level of the plurality of axially aligned price levels and the highest traded price level of the plurality of axially aligned price levels.

15. The non-transitory computer readable medium of claim 14 where the column indicator changes relative to the plurality of axially aligned price levels between the lowest traded price level of the plurality of axially aligned price levels and the highest traded price level of the plurality of axially aligned price levels according to changes in at least one of the lowest traded price and the highest traded price.

16. The non-transitory computer readable medium of claim 13 where the acts further comprise determining the a lowest traded price for the tradeable object for the user-selected time period based on at least one of a last traded price received from the electronic exchange and a lowest traded price received from the electronic exchange, where the lowest traded price indicator is movable relative to the plurality of axially aligned price levels according to at least one the last traded price received from the electronic exchange and the lowest traded price received from the electronic exchange.

17. The non-transitory computer readable medium of claim 13 where the acts further comprise determining a highest traded price for the tradeable object for the user-selected time period based on at least one of the last traded price received from the electronic exchange and a highest traded price received from the electronic exchange where the highest traded price indicator is movable relative to the plurality of axially aligned price levels according to at least one the last traded price received from the electronic exchange and the highest traded price received from the electronic exchange.

18. The non-transitory computer readable medium of claim 13 where the order indicator represents a quantity available for trading.

19. The non-transitory computer readable medium of claim 18 where the order indicator comprises any of a graphical indicator, a numerical indicator, a color-coded indicator, and combinations thereof.

20. The non-transitory computer readable medium of claim 13 where the order indicator represents any of a current bid, a current ask, a highest bid, and a lowest ask.

21. The non-transitory computer readable medium of claim 13 where a range of the plurality of axially aligned price levels is adjustable according to a repositioning command.

22. The non-transitory computer readable medium of claim 13 where the acts further comprise displaying an order entry region aligned with the plurality of axially aligned price levels, the order entry region having a plurality of locations for receiving commands for submitting orders for trading, where each location of the plurality of locations corresponds to at least one of the plurality of axially aligned price levels.

23. The non-transitory computer readable medium of claim 14 where the acts further comprise moving the lowest traded price indicator from the lowest traded price level to an updated lowest traded price level of the plurality of axially aligned price levels in response to receipt of an updated last traded price being lower than the lowest traded price of the tradeable object, where the column indicator is displayed relative to each price level of the plurality of axially aligned price levels between the updated lowest traded price level of the plurality of axially aligned price levels and the highest traded price level of the plurality of axially aligned price levels.

24. The non-transitory computer readable medium of claim 14 where the acts further comprise moving the highest traded price indicator from the highest price level to an updated highest traded price level of the plurality of axially aligned price levels in response to receipt of an updated last traded price being higher than the highest traded price of the tradeable object, where the column indicator is displayed relative to each price level of the plurality of axially aligned price levels between the lowest traded price level of the plurality of axially aligned price levels and the updated highest traded price level of the plurality of axially aligned price levels.

* * * * *